United States Patent [19]

Hauser

[11] Patent Number: 5,605,212

[45] Date of Patent: Feb. 25, 1997

[54] WASHING MACHINE TRANSMISSION CLUTCH/BRAKE MECHANISM

[75] Inventor: Hans Hauser, Strongsville, Ohio

[73] Assignee: MTD Products Inc, Cleveland, Ohio

[21] Appl. No.: 386,881

[22] Filed: Feb. 10, 1995

Related U.S. Application Data

[63] Continuation-in-part of Ser. No. 237,014, Apr. 29, 1994, Pat. No. 5,509,284, and a continuation-in-part of Ser. No. 322,291, Oct. 3, 1994, Pat. No. 5,522,242.

[51] Int. Cl.[6] .................................. F16D 67/02; D06F 37/30
[52] U.S. Cl. ........................................ 192/12 BA; 68/23.7
[58] Field of Search ............................. 192/18 R, 12 B, 192/12 BA, 15, 144, 145; 68/23.7

[56] References Cited

U.S. PATENT DOCUMENTS

| | | | |
|---|---|---|---|
| 2,751,773 | 6/1956 | Woodson | 192/12 BA |
| 2,826,056 | 3/1958 | Bruckman | 68/23.7 |
| 2,948,372 | 8/1960 | Goodlaxson | 192/18 R |
| 3,099,338 | 7/1963 | Urquhart | 192/18 R |
| 3,245,505 | 4/1966 | Staengle et al. | 192/18 R |
| 3,490,569 | 1/1970 | Reed | 192/18 R |
| 3,907,082 | 9/1975 | Shikamore et al. | 192/12 BA |
| 4,418,811 | 12/1983 | MacDonald | 192/12 BA |
| 4,878,567 | 11/1989 | Buckley et al. | 192/18 R |

*Primary Examiner*—Rodney H. Bonck

[57] ABSTRACT

A clutch/brake mechanism for a transmission of a washing machine which uses an upwardly moving disc brake activated by a spring clutch dependent on the direction of rotation of an associated motor to provide the agitation and the high speed spin of the washing machine.

19 Claims, 5 Drawing Sheets

WASHING MACHINE TRANSMISSION CLUTCH/BRAKE MECHANISM

FIELD OF THE INVENTION

This invention relates to a clutch/brake mechanism for a transmission for washing machines and, more particularly in the preferred embodiment, top loading washing machines. The application is a continuation-in-part of U.S. Ser. No. 08/237,014 filed Apr. 29, 1994, and now U.S. Pat. No. 5,509,284, and a continuation-in-part of U.S. Ser. No. 08/322,291 filed Oct. 3, 1994, and now U.S. Pat. No. 5,522,242 Washing Machine Transmission, Hans Hauser, Inventor.

BACKGROUND OF THE INVENTION

Washing machines have a transmission located immediately adjacent the tub. Typically, these transmissions produce a back and forth agitating movement of an agitator for rotation of the washing machines motor in one direction, with a continuous direct spin of the tub being produced upon the rotation of the motor in an opposite direction. The transmission thus provides a dual state operation depending upon the direction of rotation of the motor for the machine. The status of the transmission is dependent on some sort of motor rotation direction sensitive clutch/brake mechanism. Typically, these transmissions are relatively large and heavy designs having cast iron housings and complicated interconnections between parts in order to provide for the agitation movement. The Franklin and Whirlpool units are typical of these designs.

OBJECTS AND SUMMARY OF THE INVENTION

It is an object of the present invention to provide for a low cost clutch/brake mechanism for a transmission.

It is another object of the present invention to simplify the construction of transmissions.

It is yet another object of the present invention to lower the physical size of a clutch/brake mechanism for transmissions.

It is still another object of the present invention to reduce the weight of transmissions.

Is is a further object of the present invention to lower to cost and size of the associated washing machine.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

The clutch/brake mechanism of this invention is designed for preferable use with a transmission for a washing machine. The washing machine includes a motor agitator and a tub. These are found in representational form in FIG. 2 as items 8 and 7, respectively.

Figure 2:
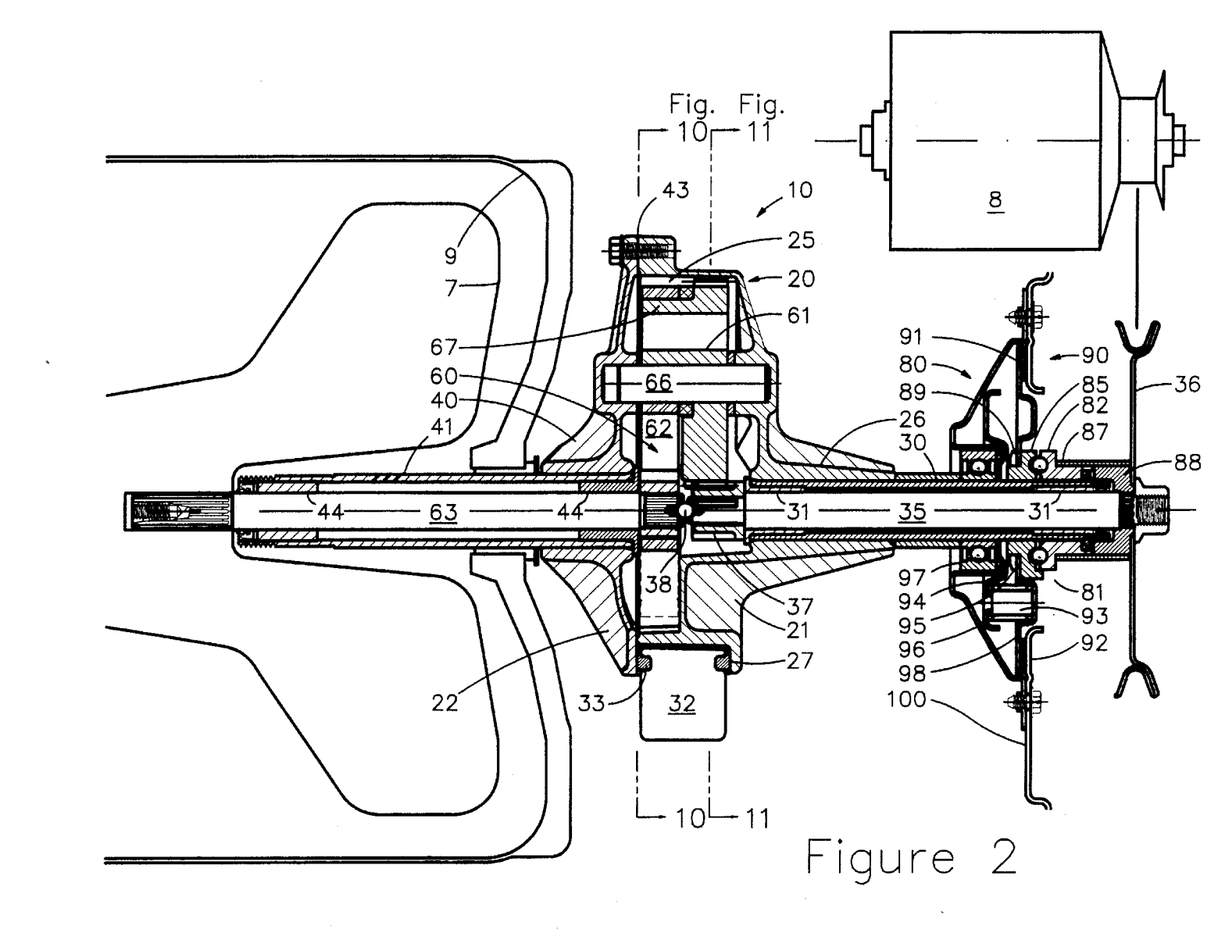
FIG. 2 is a longitudinal cross section view of the assembled transmission of FIG. 1.
Figures 3, 4:
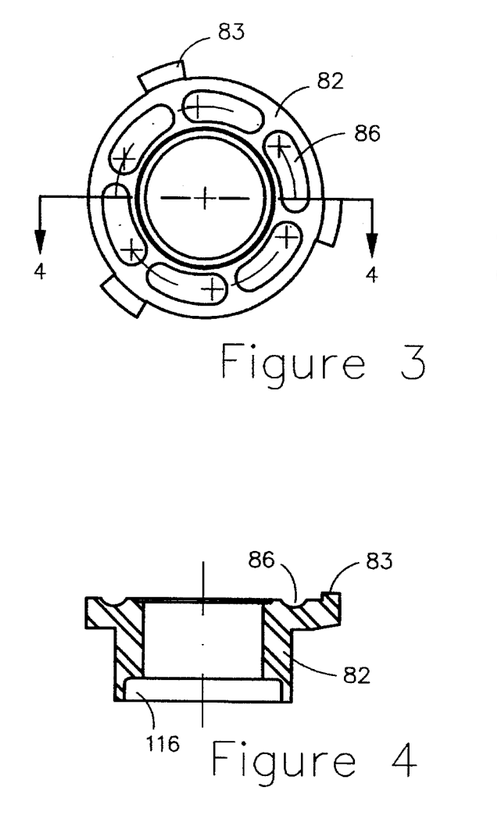
FIG. 3 is an actual size top view of the actuation member for the clutch/brake mechanism.
FIG. 4 is a cross sectional view of the actuation member of FIG. 3 taken along lines 4—4.

The motor 8 is capable of bidirectional rotation, the direction of rotation depending upon the allied washing machine control system in the customary manner. Upon rotation of this motor 8 in one direction, the transmission produces back and forth angular agitation of the agitator 7 with rotation of the motor 8 in the opposite direction causing spinning of the tub 9. This dual control action is produced by the transmission for the washing machine; and in the preferred embodiment disclosed the clutch/brake mechanism that activates the transmission. Some motors also provide variable speeds in addition to directional control so as to vary the duty cycle. Again, this duty cycle is under the control of the allied washing machine control system.

The transmission 10 includes a housing 20, an agitation system 60, and an activating system 80. The activating system 80 includes the clutch/brake mechanism of this invention.

The housing 20 serves to contain the physical elements of the transmission. The preferred housing disclosed includes a lower housing 21 and an upper housing 22. The lower housing 21 is a deep drawn casting, preferably a low density material such as aluminum, having a cavity 25 sufficient to contain the physical parts of the transmission. The lower housing 21 in addition preferably includes an integral longitudinal extension 26 on the opposite side of the cavity 25 to provide an extended bearing support. The lower housing 21 also includes a sideways extending lateral cutout 27 for localizing the counterweight (later described). An input tube 30 fixedly connected or integral to the extension 26 provides an interconnection between the frame 100 of the washing machine, the housing 20 and later described clutch system 60. Two bearings 31 are included on the inside of the input tube 30 for rotatively supporting the later described input shaft 35.

A high mass counterweight 32 is located in the cutout 27 with rubber isolator 33 retaining the counterweight 32 in location. This counterweight 32 is designed to counter balance the otherwise uncompensated for parts of the housing 20 and agitation system 60 (for example the eccentric gear 61). Without this counterweight 32, a vast increase in size and complexity of design for the other parts of the transmission 10 would be necessary to provide for a smooth balanced spinning of the wash tub 9.

In the preferred embodiment disclosed, the lower casing 21 is also made of a low density material, aluminum, while the counterweight 32 is made of a higher density material, steel. This allows for a more effective use the mass of the counterweight 32 than would be possible with similar density materials. Also, the location of the center of mass of the counterweight 32 is preferably at a significant distance greater than the compensated for parts from the rotational axis of the transmission 10 further increases its effectiveness regarding lesser distances. In this respect, also note that in the preferred embodiment the center of mass of the counterweight 32 is located approximately 50% further outward from the rotational axis of the transmission than the center of mass of the furthest item out needing compensation (the gear 61 which has its center of mass substantially coextensive with the shaft 66). This further increases the effectiveness of the counterweight.

The input shaft 35 is rotatively mounted in respect to the lower housing 21 by the bearings 31. This input shaft 35 is axially in line with the later described agitator shaft 63. This simplifies and strengthens the support of the housing 20 to the frame of the washing machine as well as allied drive parts including the tub 9.

A ball 38 between the upper end of the input shaft 35 and the lower end of the agitator shaft 63 locates both such shafts axially in position as well as providing for a thrust bearing for the later described agitator. As the ball 38 rotates and spins during the operation of the device, wear is spread out evenly over the full outer surface of such ball 38.

A pulley 36 is fixedly connected to the lower end of the input shaft 35 for supplying power between the motor 8 and the input shaft 35. The sizing of this pulley allows for a reduction in relative speed between the motor and the input shaft 35. An input pinion 37 is splined on the other end of the input shaft 35 for drivingly connecting the input shaft 35 with the later described eccentric gear 61.

The upper housing 22 completes the housing 20. The upper housing 22 consists of a low profile closure member 40 and an agitator tube 41. When the upper housing 22 is bolted to the lower housing 21 by bolts 42 with the seal 43 therebetween, the housing is complete. Two additional bearings 44 rotatively support the later described agitator shaft 63 in the agitator tube 41 of the upper housing 22. Again, the upper housing 22 is preferably made of a low density material such as aluminum so as to increase the effectiveness of the counterweight 32. As the agitation shaft 63 is in line with the input shaft 35, any inherent rotary imbalance is eliminated. The careful design techniques, for example the counterweight 32, further reduce any imbalance.

The agitation system 60 is the mechanism which alters the constant unidirectional rotation of the pulley 36 into a differing direction, a back and forth movement, of the cleansing agitator 7 in the tub 9, thus providing the necessary cleansing movement for the clothes therein. The preferred agitation system disclosed includes an eccentric gear 61, an agitator rack 62, and an agitator shaft 63.

The eccentric gear 61 is rotatively mounted to the housing 20 by an idler shaft 66 which is located extending between holes in the lower housing 21 and the upper housing 22. The eccentric gear 61 shown is directly rotated by the input pinion 37 which extends off of the end of the input shaft 35. The particular input pinion 37 eccentric gear 61 gear ratio has an approximate four to one reduction, a reduction significantly lower than customary in washing machine transmissions.

A bearing piece 67 extends off of one side of the eccentric gear 61. The center of this bearing piece 67 is displaced from the center of the eccentric gear 61. The side of the bearing piece 67 has a hole 69 through it and the rest of the axial depth of the eccentric gear 61 in order to reduce side to side imbalance forces during rotation (later described). A raised pie shaped section 68 off of the top of the eccentric gear 61 also aids in reducing this imbalance.

Figure 9:
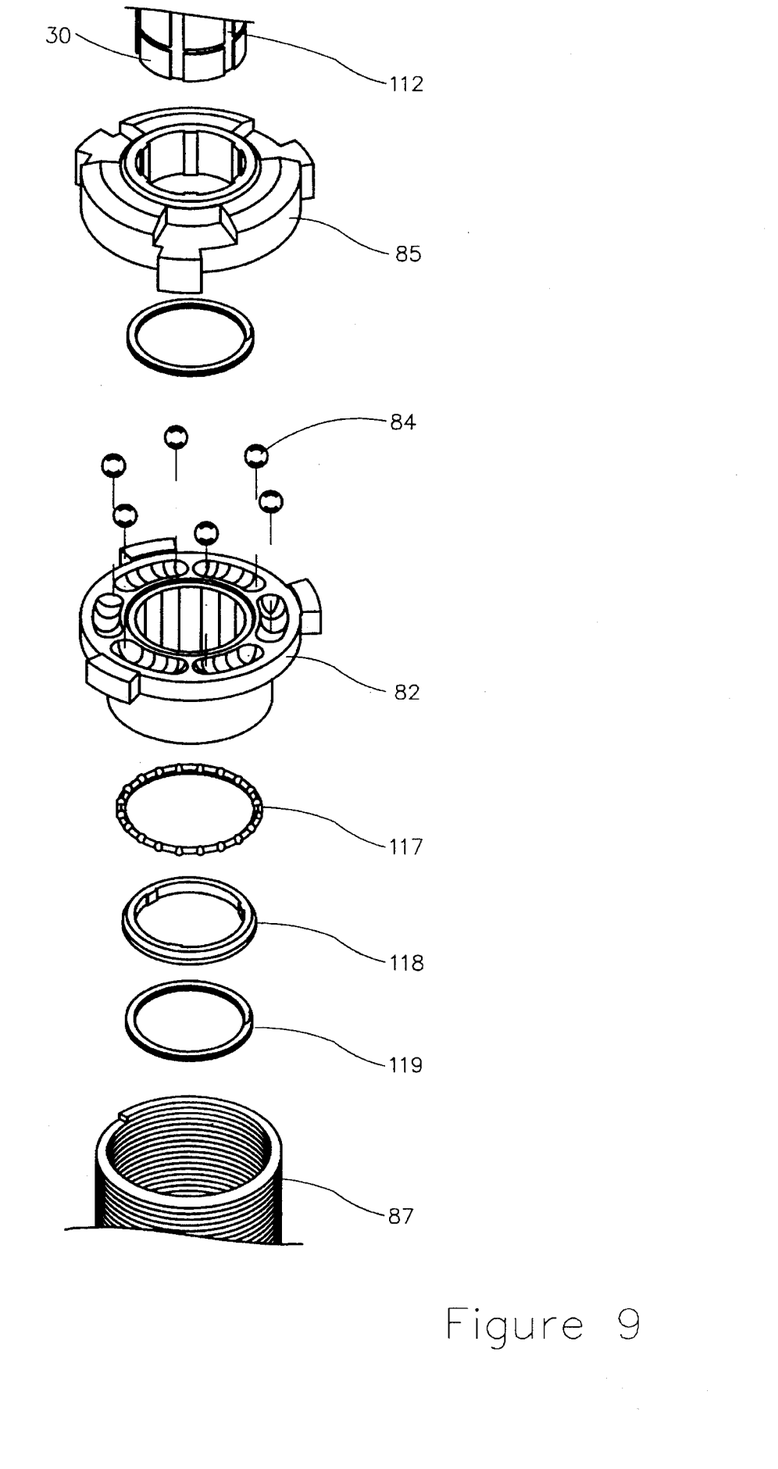
FIG. 9 is an enlarged perspective view of the activation and reaction members of FIG. 1.
Figure 10:
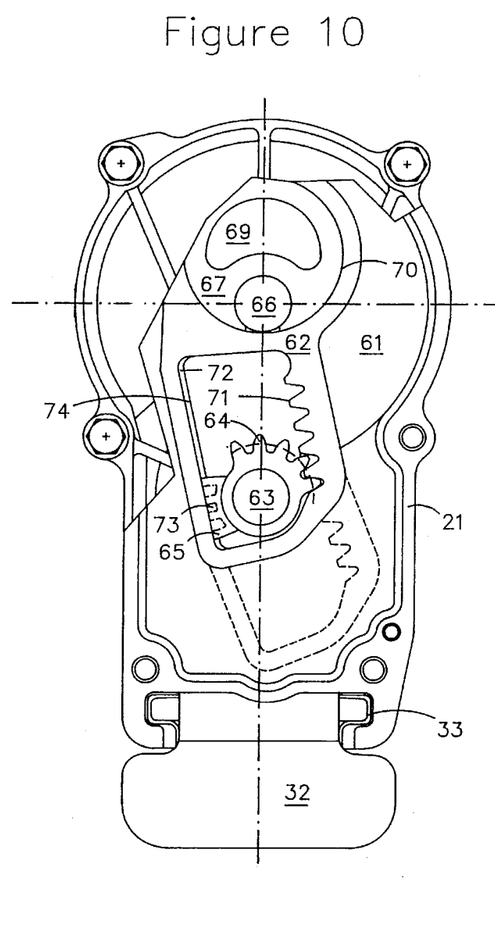
FIG. 10 is a lateral cross sectional view of the transmission taken substantially along lines 10—10 in FIG. 2; and, FIG. 11 is a second lateral cross sectional view of the transmission taken substantially along lines 11—11 in FIG. 2 without counterweight.
Figure 11:
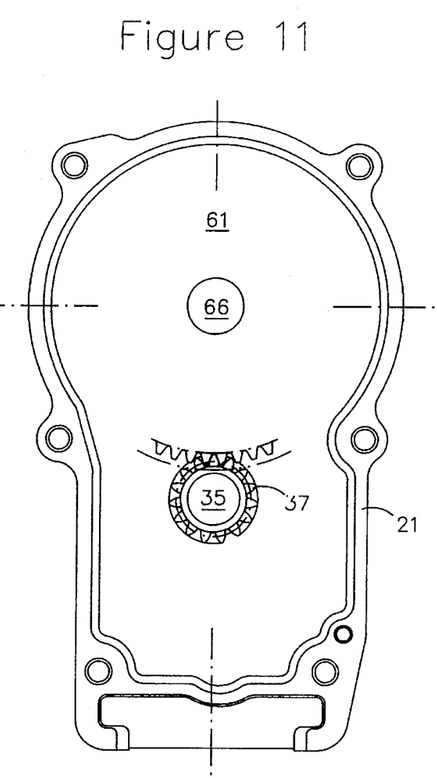

The agitator rack 62 has a circular bearing 70 and a cavity with teeth 71 (see FIG. 10). The circular bearing 70 of the agitator rack 62 is located around the bearing piece 67 of the eccentric gear 61 with the toothed head 64 of the agitator shaft 63 in driving contact with the teeth 71 of the rack 62. The cavity with teeth 71 is laterally offset in respect to the circular bearing 70. This reduces vibration by locating the longitudinal power transferring axis of the rack of teeth 71 in line with the central rotational axis of the circular bearing 70 (and shaft 66). This is preferred. A small bearing pad 65 extends between the non-toothed section of the head 64 of the agitator shaft 63 so as to bear on the flat surface 74 of the cavity in the rack 62 on the opposite side as the teeth 71. This bearing pad 65 has longitudinal slots (dotted lines 73 in FIG. 9) molded into the bottom thereof in order to provide for uniform wall thickness and thus improve cooling. The bearing pad further has a slight lip 75 formed extending off of the top thereof. This lip 75 cooperates with a small groove 72 formed in the top surface of the rack 62 to support the bearing pad 65 in position. Other means such as a groove in the toothed end of the agitator shaft with corresponding lip for the bearing piece 65, a washer above pinion 37, etc. could also be used to hold this bearing pad 65 in axial position.

The agitator shaft 63 itself is supported by bearings 44 to the agitator tube 41 of the housing 20. The longitudinal rotational axis of the agitator shaft 63 is in line with the longitudinal rotational axis of the input shaft 35. This allows the use of a simple ball thrust bearing ball 38 as well as simplifying the construction of the remainder of the washing machine.

During agitation, the housing 20 is fixedly connected to the frame of the washing machine (by the later described disc brake assembly 90). This forces the input shaft 35 to rotate in respect to the housing 20. This in turn causes the eccentric gear 61 to rotate. As the eccentric bearing piece 67 has a central rotational axis offset from that of the eccentric gear 61, any rotation of the eccentric gear 61 causes the agitator rack 62 to move back and forth with a reciprocating reversing movement for a limited longitudinal extent. As the teeth 71 of the rack 62 are in driving engagement with the toothed head 64 of the agitator shaft 63, this mechanism translates the pure rotation of the input shaft 35 into a back and forth limited reversing rotational movement of the agitator shaft 63 (about 110° in the embodiment shown). This transformation is facilitated by the use of the bearing pad 65 between the toothed head 64 and the flat surface 74 of the rack. The reason for this is that the bearing pad 65 spreads out the force from the toothed head 64 over a larger surface than otherwise possible (without the bearing pad 65, there would be direct linear contact between the toothed head 64 and the flat surface 74, thus concentrating the forces in a very small area). This increases wear and reduces durability of the transmission. The bearing pad 65 reduces friction and wear between the agitator rack 62 and the agitator shaft 63.

Due to the use of the preferred design, the amount of mass shifting in the transmission 10 is reduced relative to other systems. For example as explained and as can be seen in FIG. 9, most of the side to side shifting is caused by the bearing piece 67 of the eccentric gear 61 and the circular bearing 70 of the agitator rack. Due to the hole 69 in the bearing piece 67 and the narrow width of the circular bearing 70, the effective mass of both of these parts are minimized. This in combination with the high effectiveness of the mass of the counterweight 32 and the pie shaped raised section 68 of the eccentric gear 61 (as previously described) reduces off balance rotation. This is particularly so when one considers the effective mass of the damp clothes in the washing tub during any spin cycle. The designed in parameters thus lowers vibration relative to competitive designs.

The operative condition, agitation, or rotation of the transmission 10 is produced by an activating system 80. This activating system 80 includes a means of tying the input pulley 36 directly to the housing 20 so as to transfer 100% of the rotation of the pulley 36 to such housing 20. This causes spinning of the tub 9. A means to interconnect the housing 20 to the fixed relatively immovable position frame 100 of the washing machine is also included so as to lock the housing 20 into position in respect thereto. This activates agitation by providing a reaction lock for the agitation system. As later described, the selective operation of one or the other of these means produces the two operative conditions for the transmission 10. The selective operation is controlled by the clutch/brake mechanism invention of this application.

In the unpowered condition of the transmission 10, the default condition is the fixing of the housing 20 to the frame 100 of the washing machine by the later described brake assembly 90. (This condition is produced by the force of three springs 93 acting downwardly on a brake disc 91 so as to engage it with a brake surface 92 of the frame 100.) This operative condition of the transmission 10 remains in effect on rotation of the pulley 36 into an agitation direction. At this time, the brake assembly 90 provides a reaction member for the agitation.

On rotation of the pulley 36 in a spin direction, the brake assembly 90 is released and the housing 20 tied to the pulley 36 for common rotation. This operative condition of the transmission 10 remains in effect on continuation of rotation of the pulley 36 in a spin direction, reverting to a default condition on cessation of such rotation.

Figure 1:
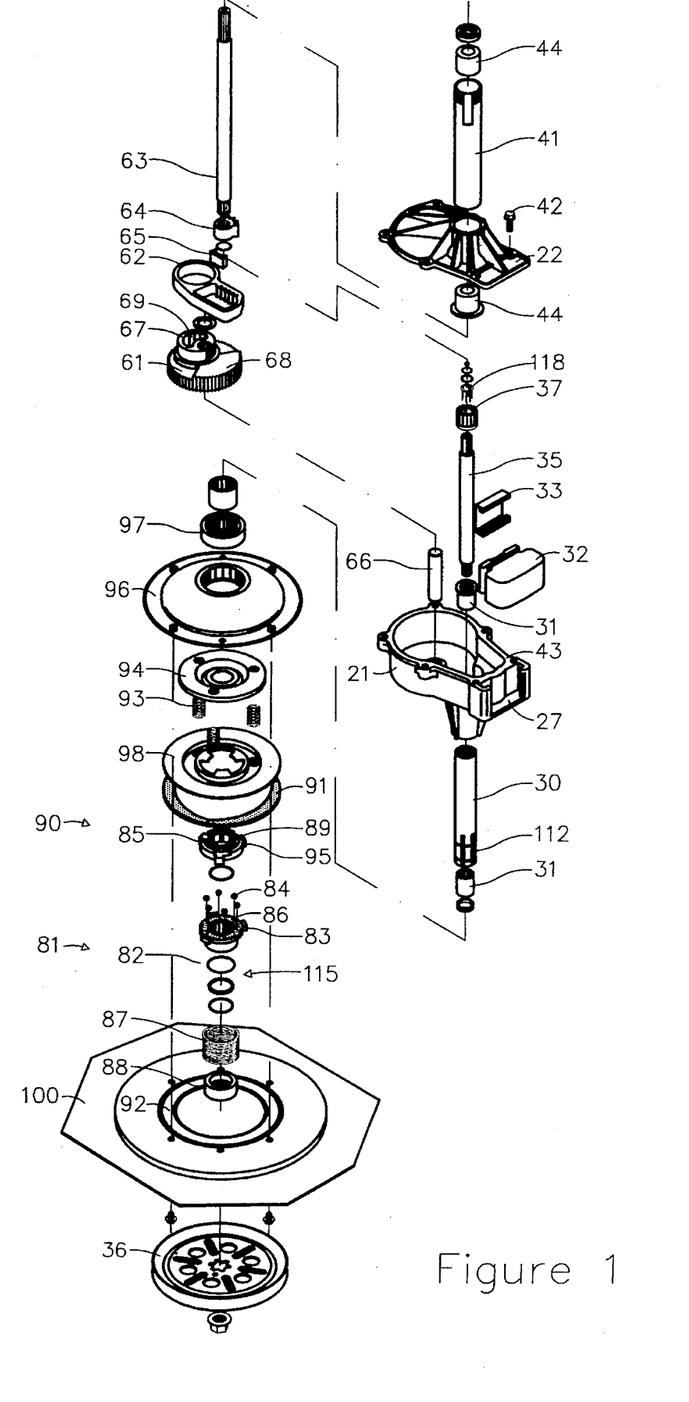
FIG. 1 is a perspective view of a disassembled transmission incorporating the invention of the application.

In the embodiment disclosed in FIG. 1, the two conditions are provided by an inclined ramp clutch assembly 81 and a large disc brake 90. The particular clutch assembly 81 disclosed provides for the rotation connection as well as deactivating the disc brake. It thus is part of both means.

The inclined ramp clutch assembly 81 includes an actuation member 82, a reaction member 85, a pulley hub 88, and a clutch spring 87.

The pulley hub 88 is fixedly connected to the input pulley 36 for rotation therewith in either direction. This pulley hub 88 shown is a generally cylindrical member some ⅔" high and 1+½" in diameter connected by a lower star shaped protrusion to the pulley 36. This pulley hub 88 has, at its outer circumference, a unidirectional spiral wound clutch spring 87 surrounding it. This clutch spring 87 is spiral wound so as to allow free rotation of the pulley hub 88 in one direction of rotation while locking the pulley hub 88 to the actuation member 82 for rotation therewith on rotation in the other direction. The particular clutch spring 87 is left hand close wound of 1/16" wide substantially square wire having an inner diameter very slightly less (1/100) than the 1+½" diameter of the pulley hub 88. There are some 18 coils in a stack 1+¼" high.

A small thrust bearing 115 some 1+¼" in diameter is located between the actuation member 82 and the pulley hub 88. This bearing 115 facilitates the later described relative 35° actuation rotation between these two parts. The particular bearing 115 disclosed includes one race 116 formed integrally with the actuation member 82, a ball retainer 117, and a separate lower ball raceway 118. A retaining ring 119 maintains the parts in position so as to complete the bearing.

The actuation member 82 shown is substantially cylindrical in shape having an outer diameter and height substantially matching that of the pulley hub 88 (1+½" and ⅔" respectively). The aggregate height of the actuation member 82 and the pulley hub 88 substantially matches that of the clutch spring 87.

The actuation member 82 includes on its upper surface a number of inclined ramp pockets 86 (six shown). It is preferred that there be from three to nine pockets in order to reduce the compressive and actuation forces on each individual pocket and contained ball. In general, the smaller or more damageable the balls, the greater the number of pockets. With the embodiment herein set forth having a design envelope of a 35° actuation movement, six pockets and ¼" balls are utilized. An upper flange some 2" in diameter and ¼" thick provides for a location for the inclined ramp pockets 86. Each of these ramp pockets 86 allow for slightly over ½" of ball travel with an initial angle of substantially 9° and thereafter continually less for most of the ramps length with the upper end of the ramp being angled at substantially 3°. This ramp pocket is curved at about a 4.25" or 4.67" radius. This curved ramp design is preferred due to its even compensation for the change in spring compression rates during activation. The 3° top angle encourages the ball to roll down the ramp when the motor 8 is stopped. Alternately the ramp pockets 86 might be angled, for example, a constant 6° along the ramp length. The ramps each extend some 35° about the circumference of the actuation member 82. The total depth of the ramp pocket 86 is slightly less (0.010) than the radius of the later described actuation balls 84. The tabs 83 extend some ⅛" outwards of the upper flange of the actuation member, each for some 20° about the actuation member 82.

The reaction member 85 is located immediately above the actuation member 82. The reaction member 85 includes inward projections 111 that fit into corresponding grooves 112 on the outer circumference of the tube 30 of the lower housing 21 to fixedly tie the same together for common rotation. The pockets 87 inverse to those in the agitation member 82 are formed in the lower surface of the reaction member 85 (i.e., reversed 180° in profile). Note that it is preferred that again both these ramp pockets have a reduced (or even flat) incline at their shallowest ends. The reason for this is while the initial spin torque might be high (50 pounds for example), the continuing spin torque can be a fraction of this (ten pounds for example). As in the preferred embodiment disclosed, there is a substantially 180 pound spring force from the disc brake springs 93, the use of the reduction in incline is utilized to maintain the brake in deactivated condition even during a severe torque drop as long as the pulley 36 continues to be rotated by the motor in a spin direction. In addition, the reduction in incline also aids to prevent stuttering when there are torque load variations at a given level (unbalanced loads for example).

Figures 5, 6:
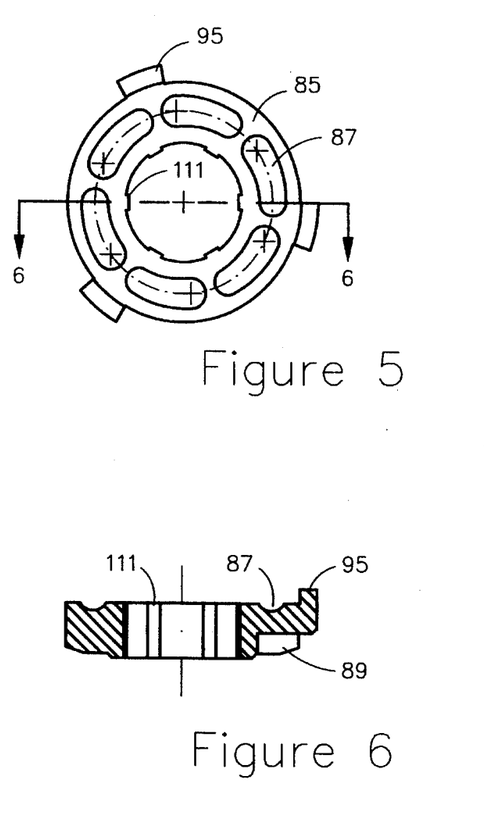
FIG. 5 is an actual size bottom view of the reaction member for the clutch/brake mechanism.
FIG. 6 is a cross sectional view of the reaction member of FIG. 5 taken along lines 5—5.
Figure 7:
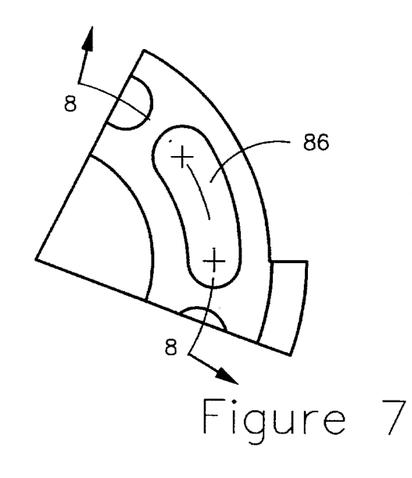
FIG. 7 is an enlarged view of one of the ramp pockets of the actuation member.
Figure 8:
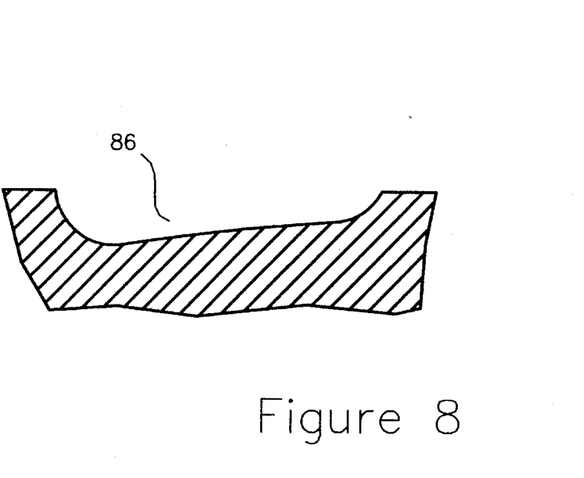
FIG. 8 is an enlarged cross sectional side view of the ramp pockets of FIG. 7 taken generally along the arc 8—8.

The reaction member 85 shown is a generally disklike member some 2" in diameter and ½" thick. There are three inclined ramp pockets 87 in the lower surface of the reaction member 85. These pockets 87 are inverse image to those pockets 86 in the actuation member 82 (FIG. 5). Three tabs 95 are located extending downwardly some ⅛" off of the outer edge of the reaction member 85 for some 20° about the reaction member 85. These tabs 95 and the tabs 83 of the actuation member 82 are located in respect to each other such that when in contact, the resting spot for the actuation balls 84 is somewhere on the 3° surface. The pockets 89 and a circumferential support groove are located on the upper surface of the reaction member 85. The pockets 89 interact with matching inwardly extending teeth on the disc brake 91 so as to tie the two parts rotatively together. The support groove allows the inner part of such disc 91 to overlay the reaction member 85, thus strengthening this interconnection in respect to axial forces therebetween.

The actuation balls 84 are captured between the ramp of the actuation member 82 and the pockets of the reaction member 85. It is preferred that these actuation balls be made of brass. The reason for this is to avoid fretting or indentations that might cause the brakes to hang up. Alternately, other resilient materials may be used, for example, plastics, orlon, or nylon. These balls 84 act to physically separate the actuation member 82 from the reaction member 85 on the relative rotation therebetween in one certain direction. These actuation balls are some ¼" in diameter.

The set of overlapping tabs 95, 83 respectively extending off of the edges of the reaction member 85 and actuation member 82 respectively are designed to solidly drivingly interconnect the actuation member 82 to the reaction member 85 at or slightly before the balls 84 contact the shallow end of the ramp pockets 86 while such balls 84 are located on the 3° surface.

With this orientation, relative rotation between the actuation member 82 and reaction member 85 in one direction moves the reaction member 85 first upwards (via the clutch spring 87 and the balls 84 against the springs 93) for the first 35° and then ties the reaction member 85 to the actuation member 82 (via the tabs 95–83) for rotation therewith. As the reaction member 85 is in turn solidly connected to the housing 20 (via its toothed inner surface to the lower end of the tube 30 of the lower housing), this rotation of the reaction member 85 also serves to tie the pulley 36 to the housing 20 for common rotation (i.e., spin cycle).

The disc brake 91 is deactivated by the upwards movement of the reaction member 85. The reason for this is the reaction member 85 is fixedly interconnected to the disc 91 of the disc brake assembly for common upwards movement; this by the top of the toothed outer surface 89 pushing against member 98. Thus the brake is deactivated as the actuation member 82 rotates in respect to the reaction member 85 and pushes the same upwards.

As rotation of the operative actuation member 82 is provided by the clutch spring 87 interconnection to the pulley hub 88 caused by rotation of the pulley 36 in one direction, the operative condition of the inclined ramp clutch assembly 81 is dependent on the direction of rotation of the motor 8.

The activation of the disc brake 91 serves as the means to cause agitation to occur. This will occur if the motor 8 revolves in an agitation direction. The reason for this is the operation of the disc brake assembly 90.

The disc brake assembly 90 disclosed includes a brake disc 91, a brake ring 92, a spring 93, and a reaction member 94.

The brake disc 91 itself is a flat circular member having a brake surface at its outer lower edge. The inside opening of this brake disc 91 is, as previously discussed, interengaged with the toothed outer surface of the reaction member 85 (through part 98) so as to lock the brake disc 91 to tie such disc 91 to such member 85 for rotation and upward motion therewith.

The brake disc 91 shown is some 5+½" in diameter with a ⅔" wide band of brake material on the outer circumference thereof. The inwardly extending tabs are three in number, each substantially ½" wide and ⅜" long. The central opening is approximately 2" in diameter.

A support member 94 extends between the lower part of the housing 20 to a location adjacent to the upper surface of the brake disc 91. This support member is substantially 4" in diameter with a 1" inner opening. This support member presses upwards against the inner race of the lower main bearing 97 with the spring 93 extending between the support member and the brake disc 91 to bias same into braking condition with the frame via the springs 93 between the brake disc 91 and the support member 94. These springs 93 serve to bias the brake disc 91 into an actuated or braked position against the brake ring 92 (180 pounds spring force in the disclosed embodiment). The springs 93 also serve to physically locate the support member in position relative to the brake disc 91. The spring 93 each are about 1" long and ½" in diameter with coils of ¹/₁₀" thick wire. The brake ring 92 is itself fixedly connected to the stationary frame 100 of the washing machine. The brake ring 92 itself has a diameter and width substantially the same as the brake material on the brake disc 91.

As the brake disc 91 is fixedly connected to the housing 20 for rotation therewith in its spring loaded default condition, this serves to lock the washing machine tub (via a disc 91) into a default braked condition preventing the rotation thereof. This activates the agitation mechanism of the transmission.

The inside of the brake disc 91 is positioned next to the upper surface of the reaction member 85 such that upward movement of this reaction member 85 causes the brake disc 91 to move upwards against the force of the spring 93 and thus release the brake.

In the embodiment shown, the disc brake assembly 90 is located adjacent to the main lower bearing support 96, a fixed part of the washing machine frame, immediately adjacent to the main lower bearing 97. This lower bearing support is a generally conical member having an inset portion to hold the main lower bearing 97. The member has a diameter of 7+½" and a height of 1+¼" with a 2" diameter inset portion. This member is fixedly connected to the frame of the washing machine, completely enclosing the clutch/brake mechanism of this invention. This enclosure protects the clutch/brake mechanism from water leaks, dust, and other physical contaminants.

The ramp assembly 86 and brake assembly 90 are activated by the direction of rotation of the input shaft 35.

Upon rotation of the input shaft 35 and the pulley hub 36 in one direction, the clutch spring 87 is not activated and the actuation balls 84 are located and remain at the lower ends of their ramps in the actuation member 82 and their reaction member 85. This allows the disc brake 91 to continue to contact the brake ring 92, thus holding the lower housing 21 in a position of non-rotation. This provides a reaction member for the previously described agitation system.

On rotation of the input shaft 35 and the pulley hub 36 in the opposite direction, the clutch spring 87 is activated tying the actuation member 82 to the pulley hub 36 for common rotation. This in turn forces the actuation balls 84 to be moved to the upper ends of their respective ramps in the actuation member 82 and the reaction member 85. This causes the reaction member 85 to move in an upwards direction. As the brake disc 91 is located immediately adjacent to the upper surface 95 of the reaction member 85, this movement also forces the disc brake 91 upwards against the force of the springs 93 to move away from the brake ring 92. This releases the brake. When the tabs 83, 95 subsequently contact, the tabs serve to tie the actuation member 82 to the reaction member 85 for rotation therewith. This in turn ties the input shaft 35 to the housing 20 for rotation therewith causing spinning of the tub. Therefore, as long as the pulley 36 (and the shaft 35) continue to rotate in a single direction, the tub 9 continues to rotate with the shaft. This continues spinning of the tub 9.

On cessation of rotation of the input shaft 35, the activation mechanism reverts to its default braked condition. This is facilitated by the inertial qualities of the rapidly spinning tub 9 which causes the reaction member 85 to move faster than the actuation member 82, forcing the balls 84 downwards to the low ends of their ramps thus reactivating the brake 90. The 3° initial incline of the respective pockets facilitates this return to braking condition.

Upon resetting of the brake to its default condition, rotation of the shaft in the first direction will cause agitation of the agitator 7, with reverse rotation again spinning the tub 9.

Modification of this agitation/spin activation system are possible. For example, the two operative conditions are provided by a relative clutch and a relative brake with the activation occurring depending on the direction of rotation of the pulley 36 in one direction activating the clutch with rotation in a second direction actuating the brake. Other means of accomplishing this could be provided.

Although the invention has been described in its preferred embodiment with a certain degree of particularity, it is to be understood that numerous changes can be made without deviating from the invention as hereinafter claimed.

What is claimed is:

1. A clutch/brake mechanism for a washing machine transmission including an input shaft driven by a bidirectional motor, an actuation member, unidirectional clutch means to fixedly connect said actuation member to the input shaft on rotation of the motor in one direction, a reaction member, means to rotatively support said reaction member about the input shaft next to said actuation member, separation means between said actuation member and said reaction member such that rotation of said actuation member in said one direction moves said reaction member away from said actuation member, a brake disc, means to rotatively mount said brake disc about the input shaft next to said reaction member connected to said reaction member for common movement away from said actuation member, a brake surface, means to non-rotatively mount said brake surface to the washing machine, and spring means to bias said brake disc into braking contact with said brake surface such that rotation of the motor in said one direction releases the brake.

2. The clutch/brake mechanism of claim 1 characterized in that separation means includes inclined ramp pockets in both said actuation member and said reaction member, actuation balls, and said actuation balls being in said pockets.

3. The clutch/brake mechanism of claim 1 characterized by interconnect means to rotatively connect said reaction member to actuation member upon release of the brake.

4. The clutch/brake mechanism of claim 3 characterized in that said interconnect means includes overlapping tabs.

5. The clutch/brake mechanism of claim 1 characterized in that said unidirectional clutch means includes a close wound clutch spring.

6. The clutch/brake mechanism of claim 5 characterized in that said unidirectional clutch means further includes a pulley hub, means to fixedly connect said pulley hub to the input shaft, said pulley hub having an outer surface, said actuation member having an outer surface and said close wound clutch spring surrounding said outer surface of said pulley hub and said outer surface of said actuation member.

7. A clutch/brake mechanism for a washing machine transmission including a pulley driven by a bidirectional motor and an input shaft, the mechanism comprising the pulley being fixedly connected to the input shaft, an actuation member, unidirectional clutch means to fixedly connect said actuation member to the pulley on rotation of the motor in one direction, a reaction member, means to rotatively support said reaction member about the input shaft above said actuation member, separation means between said actuation member and said reaction member such that rotation of said actuation member in said one direction moves said reaction member upwards, a brake disc, means to rotatively mount said brake disc about the input shaft above said reaction member, a brake surface, means to non-rotatively mount said brake surface to the washing machine, spring means to bias said brake disc downward into braking contact with said brake surface, and means to connect said reaction member to said brake disc from common upward movement such that rotation of the motor in said one direction releases the brake.

8. The clutch/brake mechanism of claim 7 characterized in that separation means includes inclined ramp pockets in both said actuation member and said reaction member, actuation balls, and said actuation balls being in said pockets.

9. The clutch/brake mechanism of claim 7 characterized by interconnect means to connect said reaction member to said actuation member upon release of the brake.

10. The clutch/brake mechanism of claim 9 characterized in that said interconnect means includes overlapping tabs.

11. The clutch/brake mechanism of claim 7 characterized in that said unidirectional clutch means includes a close wound clutch spring.

12. The clutch/brake mechanism of claim 11 characterized in that said unidirectional clutch means further includes a pulley hub, means to fixedly connect said pulley hub to the pulley, said pulley hub having an outer surface, said actuation member having an outer surface and said close wound clutch spring surrounding said outer surface of said pulley hub and said outer surface of said actuation member.

13. An activating mechanism for a washing machine transmission including an input shaft driven by a motor, an actuation member, unidirectional clutch means to fixedly connect said actuation member to the input shaft on rotation of the motor in one direction, said actuation member having a surface, first inclined pockets, said first inclined pockets being in said surface of said actuation member, a reaction member, means to rotatively support said reaction member next to said actuation member, said reaction member having a surface, second inclined pockets, said second inclined pockets being in said surface of said reaction member, actuation balls, said actuation balls being in said first and said second inclined pockets such that rotation of said actuation member in said one direction moves said reaction member away from said actuation member, and a brake means connected to said reaction member such that rotation of the motor in said one direction releases the brake.

14. The activating mechanism of claim 13 characterized in that said actuation member, said reaction member, and said actuation balls each have a hardness and said hardness of said actuation balls being less than said hardness of said actuation member and said reaction member.

15. The actuation mechanism of claim 13 characterized in that said actuation member and said reaction member are powder metal and said actuation balls are brass.

16. The activating mechanism of claim 13 characterized in that at least one of said first or said second inclined pockets are not uniformly inclined.

17. The activating mechanism of claim 16 characterized in that said at least one of said first or said second inclined pockets are continually differentially inclined.

18. A activating mechanism of claim 13 characterized in that at least one of said first or said second inclined pockets has a shallow end, and said shallow end being inclined at an angle of greater than 2°.

19. The activating mechanism of claim 13 characterized by spring means to bias together said surface of said reaction member and said surface of said actuation member.

* * * * *